(12) United States Patent
Carrara

(10) Patent No.: US 10,336,623 B2
(45) Date of Patent: Jul. 2, 2019

(54) METHOD FOR REVAMPING AN AMMONIA CONVERTER

(71) Applicant: Casale SA, Lugano (CH)

(72) Inventor: Davide Carrara, Fino Mornasco (IT)

(73) Assignee: Casale SA, Lugano (CH)

( * ) Notice: Subject to any disclaimer, the term of this patent is extended or adjusted under 35 U.S.C. 154(b) by 0 days.

(21) Appl. No.: 15/741,438

(22) PCT Filed: May 17, 2016

(86) PCT No.: PCT/EP2016/061016
§ 371 (c)(1),
(2) Date: Jan. 2, 2018

(87) PCT Pub. No.: WO2017/005399
PCT Pub. Date: Jan. 12, 2017

(65) Prior Publication Data
US 2018/0186649 A1 Jul. 5, 2018

(30) Foreign Application Priority Data
Jul. 7, 2015 (EP) ..................................... 15175687

(51) Int. Cl.
*C01C 1/04* (2006.01)
*B01J 8/04* (2006.01)

(52) U.S. Cl.
CPC ........... *C01C 1/0417* (2013.01); *B01J 8/0415* (2013.01); *B01J 8/0496* (2013.01);
(Continued)

(58) Field of Classification Search
CPC ................... B01J 8/0415; B01J 8/0496; B01J 2208/0015; B01J 2208/00159;
(Continued)

(56) References Cited

U.S. PATENT DOCUMENTS

| | | | | |
|---|---|---|---|---|
| 4,769,220 A | * | 9/1988 | Zardi | ...................... B01J 8/0415 422/148 |
| 2007/0274880 A1 | * | 11/2007 | Filippi | ..................... B01J 8/043 422/600 |

(Continued)

FOREIGN PATENT DOCUMENTS

| | | |
|---|---|---|
| CN | 104069777 A | 10/2014 |
| EP | 0376000 A1 | 7/1990 |

(Continued)

OTHER PUBLICATIONS

International Search Report dated Jul. 20, 2016 in connection with PCT/EP2016/061016.

(Continued)

*Primary Examiner* — Lessanework Seifu
(74) *Attorney, Agent, or Firm* — Akerman LLP

(57) ABSTRACT

Method for revamping a multi-bed ammonia converter, wherein said converter comprises a plurality of adiabatic catalytic beds including a first catalytic bed and one or more further catalytic bed(s), said catalytic beds being arranged in series so that the effluent of a bed is further reacted in the subsequent bed; at least a first inter-bed heat exchanger arranged between said first catalytic bed and a second catalytic bed to cool the effluent of said first bed before admission into said second bed, and optionally further inter-bed heat exchanger(s) arranged between consecutive beds; said method involves the conversion of said first catalytic bed into an isothermal catalytic bed.

11 Claims, 2 Drawing Sheets

(52) U.S. Cl.
CPC ............... *B01J 2208/0015* (2013.01); *B01J 2208/0053* (2013.01); *B01J 2208/00194* (2013.01); *B01J 2219/00024* (2013.01); *Y02P 20/52* (2015.11)

(58) Field of Classification Search
CPC .... B01J 2208/00168; B01J 2208/00194; B01J 2208/0053; B01J 2219/00024; C01C 1/0405; C01C 1/0417
USPC ........................................................ 422/148
See application file for complete search history.

(56) References Cited

U.S. PATENT DOCUMENTS

2011/0293502 A1 12/2011 Ungar et al.
2012/0279033 A1 11/2012 Filippi et al.

FOREIGN PATENT DOCUMENTS

EP     1707259 A1  10/2006
EP     2610001 A1   7/2013

OTHER PUBLICATIONS

International Preliminary Report on Patentability dated Jun. 27, 2017, in connection with PCT/EP2016/061016.

\* cited by examiner

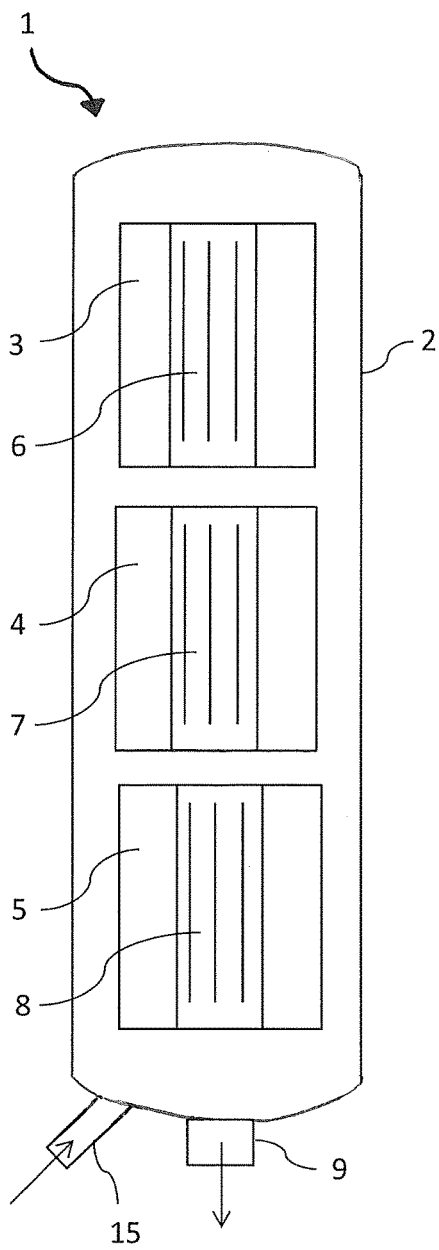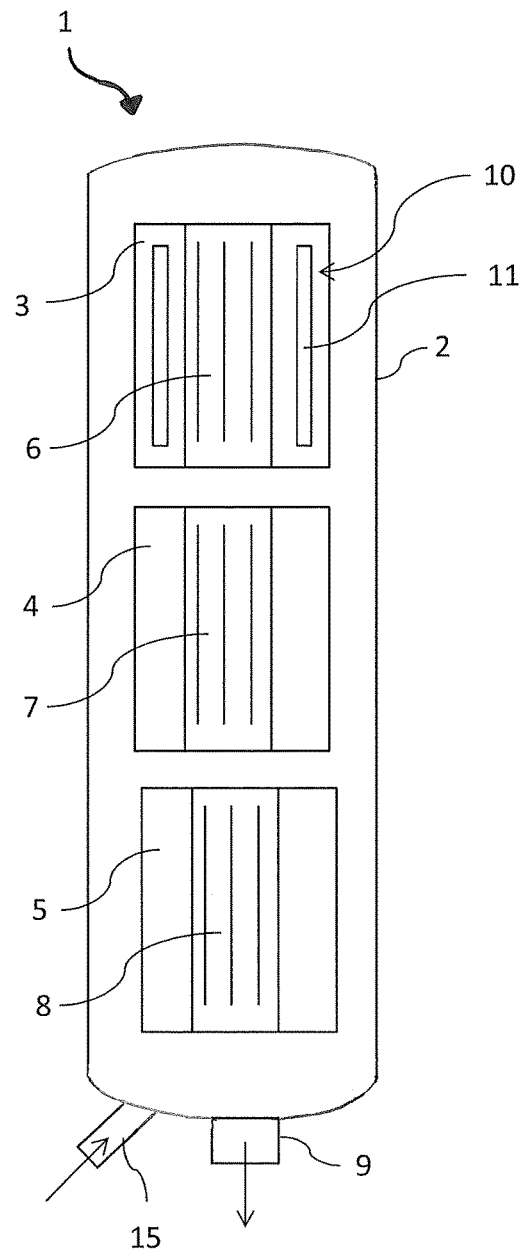
FIG. 1
(prior art)
FIG. 2

METHOD FOR REVAMPING AN AMMONIA CONVERTER

This application is a national phase of PCT/EP2016/061016, filed May 17, 2016, and claims priority to EP 15175687.1, filed Jul. 7, 2015, the entire contents of both of which are hereby incorporated by reference.

FIELD OF APPLICATION

The invention relates to the revamping of inter-cooled multi-bed ammonia converters.

PRIOR ART

The synthesis of ammonia from a make-up gas containing H2 and N2 is a strongly exothermic catalysed reaction.

The known ammonia converters generally comprise a plurality of catalytic beds; overheating may reduce the conversion yield and damage the catalyst and hence the converter must be designed to properly remove the reaction heat and control the temperature of the beds. The known techniques to do so include inter-cooled adiabatic beds and the so-called isothermal beds.

An adiabatic bed comprises no means to directly cool the catalyst, which means the heat produced by the chemical reaction is fully transferred to the gaseous effluent. Inter-bed heat exchangers are provided between consecutive beds in series, to cool the hot effluent of a bed before its introduction in a subsequent bed. Heat removed from the effluent can be transferred to a cooling medium (e.g. water or steam) or to make-up gas for preheating. A further cooling effect may be achieved in some cases by mixing the hot effluent with a portion of a fresh charge at a lower temperature.

A so-called isothermal bed, on the other hand, comprises a heat exchanger immersed in the catalyst mass to directly remove heat from the catalyst. Accordingly, the temperature of the effluent can be controlled within a desired small range, ideally close to the temperature of maximum reaction rate, and the inlet to outlet delta-T (difference of temperature) is smaller compared to adiabatic design. For this reason, the bed is commonly termed isothermal or nearly-isothermal.

In a multi-bed inter-cooled design, the catalytic beds have typically an annular shape with a radial flow and the intercooling heat exchangers (ICH) can be arranged coaxially inside the annular beds, see for example EP 0 376 000 and EP 2 610 001. A known layout has three catalytic beds in series with two ICHs and a bottom heat exchanger to further cool the effluent of the third and last bed.

The adiabatic design or the isothermal design are regarded as alternative in the prior art. In a limited number of cases, hybrid converters have been proposed including a first adiabatic bed followed by one or more isothermal beds.

Isothermal converters provide a more accurate temperature control and, generally, a better yield of conversion than adiabatic converters. Optimization of a converter with multiple adiabatic beds in series is complex because the operation of a bed (e.g. outlet temperature) influences the operation of all subsequent beds. The adiabatic converters however have a lower investment cost and, for this reason, the majority of ammonia converters are designed with adiabatic beds in series and ICHs. Hence there is a great interest in methods for revamping said converters, especially in order to increase the yield and/or capacity in terms of the quantity of ammonia that is or can be produced.

SUMMARY OF THE INVENTION

The purpose of the invention is to provide a method for an advantageous revamping of the existing ammonia converters with multiple catalytic beds in series and inter-bed cooling heat exchangers. The invention aims at increasing the conversion yield and/or capacity of the converter, providing a more accurate control of the reaction temperature, increasing the amount of recovered heat.

These aims are reached with a method for revamping an ammonia converter according to claim 1. Preferred features of the method are stated in the dependent claims.

The invention provides a method for revamping a multi-bed ammonia converter with ICHs wherein the first catalytic bed is converted into an isothermal catalytic bed. To this purpose, a new heat exchanger can be installed with heat exchange bodies immersed in the catalyst of the existing first bed, or a cartridge containing the first bed can be replaced with a new cartridge including a heat exchanger immersed in the catalyst.

The term of isothermal catalytic bed denotes that heat evolved in the synthesis reaction is removed from the catalytic bed and transferred to a cooling heat exchanger, to control the temperature of the bed.

The new heat exchanger of the first bed includes heat exchange bodies which can be for example tubes or plates; in a preferred embodiment the heat exchange bodies are plates. For example in most cases the existing first bed is an annular bed and the new heat exchanger preferably comprises a plurality of radially arranged plates distributed around the annular bed.

The ammonia converter comprises a first inter-bed heat exchanger between the first bed and the second bed. A feature of the invention is that said first inter-bed heat exchanger is maintained to cooperate with the newly-introduced heat exchanger which turns the first bed to isothermal operation.

The applicant has found that the combination of a first isothermal bed with inter-bed cooling is advantageous in terms of conversion rate. Despite the isothermal operation, the outlet gas temperature of the first bed is relatively high and still higher than the optimum inlet temperature of the second bed downstream. Hence, the conversion of the first bed to isothermal operation increases the yield of the first bed without affecting the operation of the second and subsequent beds, since the inlet temperature of the second bed is controlled by heat removed in the first inter-bed exchanger.

Since the reaction heat evolved in the first isothermal bed is at least partially removed by the heat exchanger plates immersed therein, the duty of said first inter-bed exchanger is reduced. This means the heat exchange surface of said inter-bed exchanger can be reduced, hence the heat exchanger can be smaller leaving more space available for catalyst, which is a further advantage of the invention.

According to some embodiments the first inter-bed exchanger is replaced with a smaller exchanger and at least part of the cleared volume inside the converter is used to accommodate an additional amount of catalyst, in particular to increase the size of the first catalytic bed. In particular, when the first inter-bed exchanger is coaxial inside an annular catalytic bed, the new heat exchanger will be smaller in diameter which means the annular bed can have a smaller inner diameter and then a larger volume for a given outer diameter.

A further aspect of the invention is a multi-bed ammonia converter comprising a plurality of catalytic beds including a first catalytic bed and one or more further catalytic bed(s), said catalytic beds being arranged in series so that the effluent of a bed is further reacted in the subsequent bed, and also comprising a plurality of inter-bed heat exchangers arranged to cool the effluent of each bed before admission to a subsequent bed, characterized in that said plurality of catalytic beds includes a first catalytic bed which comprises a heat exchanger immersed in the catalyst to operate in isothermal condition, and one or more subsequent beds which are adiabatic.

The converter according to the invention features that only the first bed is isothermal, while the other beds are adiabatic. Moreover, an inter-bed exchanger between the first isothermal bed and the subsequent adiabatic beds is provided. This design provides optimum exploitation of the first bed which is the most critical, being fed with the fresh and more reactive charge, while the overall cost is comparable to cost of the conventional adiabatic converters.

The advantages of the invention will emerge more clearly from the following detailed description.

BRIEF DESCRIPTION OF THE DRAWINGS

FIG. 1 is a simplified scheme of a multi-bed ammonia converter according to the prior art.

FIG. 2 is a scheme of the converter of FIG. 1 after a revamping in accordance with an embodiment of the invention.

DETAILED DESCRIPTION OF A PREFERRED EMBODIMENT

Figure 3:
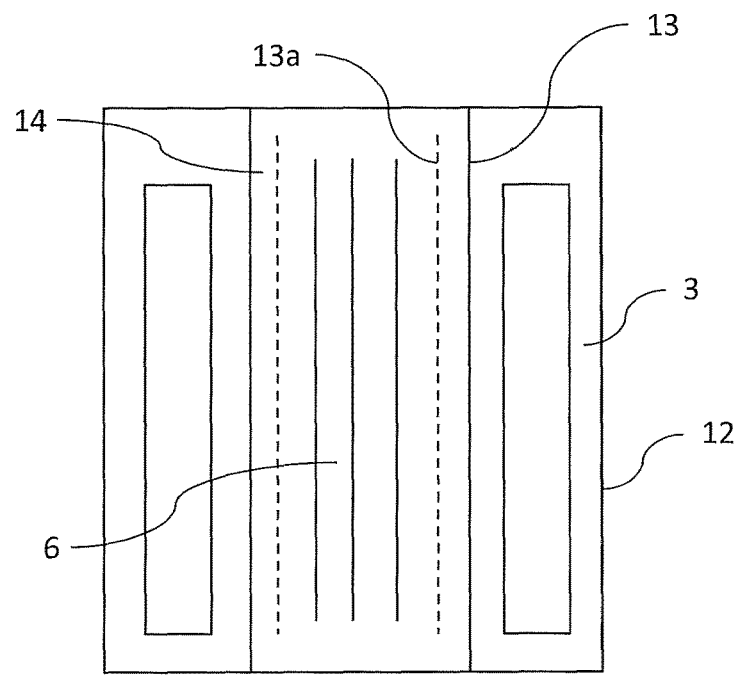
FIG. 3 is a detail of the first bed of the revamped converter.

FIG. 1 illustrates a multi-bed ammonia converter 1 including a vessel 2 and a catalytic cartridge comprising three adiabatic catalytic beds 3, 4 and 5 arranged in series and two inter-bed tube heat exchangers 6, 7 and a bottom heat exchanger 8. Each bed is traversed by a radial inward (or mixed axial-radial) flow and has an annular shape, the related tube heat exchanger being accommodated in the annulus.

A fresh make-up gas enters at gas inlet 15, is preheated while flowing upwards around the catalytic cartridge and then enters the first bed 3; the effluent of the bed 3 is cooled while flowing around tubes of the first inter-bed exchanger 6; the cooled effluent enters the second bed 4. Similarly, the effluent of the second bed 4 is cooled in the second inter-bed heat exchanger 7 before entering the third bed 5, and the effluent of the third bed 5 is cooled in the bottom heat exchanger 8 before it leaves the converter 1 via the outlet 9. One or more quenches with fresh gas may also be provided (not shown).

The catalytic beds 3, 4 and 5 are adiabatic since they contain no cooling means and the heat of the reaction is transferred to the gaseous stream of reactants and products.

The reactor of FIG. 1 is known in the art and need not be described in a further detail.

FIG. 2 shows the reactor which is revamped by addition of a plate heat exchanger 10 including a plurality of heat exchange plates 11 radially arranged in the annular bed 3. Each plate 11 is internally traversed by a cooling medium, such as water. As a result, the first catalytic bed of the revamped converter of FIG. 2 operates in an isothermal manner. The temperature of the first bed 3 can be controlled with an additional degree of freedom, by regulating the cooling medium flow and/or temperature through the plates 11.

The effluent of the bed 3 generally needs be cooled before admission into the following bed 4. However the duty of the first inter-bed heat exchanger 6 is reduced thanks to the heat removed by the new plate exchanger 10.

As illustrated in FIG. 3, the annular first bed 3 is originally delimited by an outer wall 12 and an inner wall 13. The inner wall 13 delimits the room for accommodation of the first inter-bed exchanger 6. Using a smaller heat exchanger 6 means that the inner wall 13 may have a smaller diameter and a volume 14 is cleared and made available for the bed, as denoted by dotted line 13a.

Figure 4:
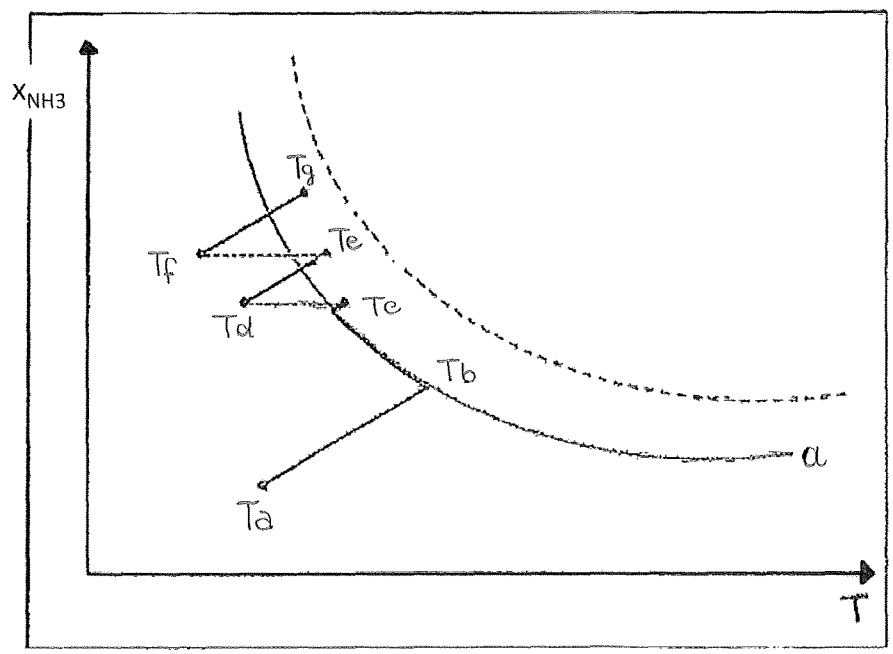
FIG. 4 shows a diagram of ammonia conversion versus temperature in a converter according to an embodiment of the invention.

The operation of the converter is illustrated by the diagram of FIG. 4.

The gaseous charge enters the first isothermal bed 3 at a temperature Ta, where it reacts evolving heat and generating a first partially reacted product stream at a temperature Tb. The heat evolved in said bed is removed by the heat exchange plates 10 immersed therein, resulting in cooling of the first product stream from Tb to Tc.

The temperature profile of the first bed 3, ranging from Ta to Tc, approaches the curve (a) of maximum reaction rate, which corresponds to the highest possible conversion per pass for a given catalyst volume.

Said first product stream is further cooled from Tc to Td in the first inter-bed heat exchanger 6 and is fed to the second bed 4 where it reacts adiabatically to provide a second gaseous stream. It can be noted that the difference in temperature between Tc and Td is relatively small, meaning the duty of the first inter-bed heat exchanger 6 is reduced.

Within the second bed 4, the reaction temperature quickly raises from Td to Te. The second stream leaving the second bed 4 is subsequently cooled in the second inter-bed heat exchanger from Te to Tf and fed to the third bed, where it further reacts adiabatically to provide a third gaseous stream with a temperature increase from Tf to Tg.

In view of the above diagram, it can be appreciated that the invention places maximum heat-exchange temperature difference and maximum cooling performance in the first catalyst bed, where maximum ammonia conversion and heat evolution take place.

The invention claimed is:

1. A method for revamping a multi-bed ammonia converter, wherein said converter comprises:
   a plurality of adiabatic catalytic beds including a first catalytic bed and one or more further catalytic bed(s), said catalytic beds being arranged in series so that the effluent of a bed is further reacted in the subsequent bed;
   at least a first inter-bed heat exchanger arranged between said first catalytic bed and a second catalytic bed to cool the effluent of said first bed before admission into said second bed, and optionally further inter-bed heat exchanger(s) arranged between consecutive beds;
   wherein said first catalytic bed is converted into an isothermal catalytic bed.

2. The method according to claim 1, wherein said first catalytic bed is converted to isothermal by adding a heat exchanger immersed in the catalyst of said first catalytic bed.

3. The method according to claim 1, wherein said first catalytic bed is replaced with a new catalytic bed containing a heat exchanger immersed in the catalyst.

4. The method according to claim 1, further comprising:
   replacing said first inter-bed heat exchanger with a new heat exchanger smaller than the previous one, wherein the smaller size of the new heat exchanger clears a volume inside the converter, and at least part of said volume is used to accommodate an additional amount of catalyst.

5. The method according to claim 4, wherein said volume is used to increase the size of said first catalytic bed.

6. The method according to claim 5, further comprising replacing said first catalytic bed with a larger one.

7. The method according to claim 5, wherein said first catalytic bed is annular and the first inter-bed heat exchanger is coaxial and inner to said bed, the new first inter-bed heat exchanger being smaller in diameter than the previous one, so that an additional volume is available to said first catalytic bed.

8. The method according to claim 1, wherein a plurality of heat exchange plates immersed in the catalyst are used to provide isothermal operation of said first catalytic bed.

9. The method according to claim 8, wherein said first bed is annular and the heat exchange plates are radially arranged.

10. The method according to claim 1, wherein the ammonia converter comprises three catalytic beds in series;

a first interbed exchanger between the first bed and second bed;

a second interbed exchanger between the second bed and third bed, and a bottom heat exchanger after the third bed.

11. A multi-bed ammonia converter comprising a plurality of catalytic beds including a first catalytic bed and one or more further catalytic bed(s), said catalytic beds being arranged in series so that the effluent of a bed is further reacted in the subsequent bed, and also comprising a plurality of inter-bed heat exchangers arranged to cool the effluent of each bed before admission to a subsequent bed, wherein said plurality of catalytic beds includes a first catalytic bed which comprises a heat exchanger immersed in the catalyst to operate in isothermal condition, and one or more subsequent beds which are adiabatic.

* * * * *